United States Patent [19]  [11] 3,949,117

Jvirblis et al.  [45] Apr. 6, 1976

[54] IMAGE INTENSIFICATION

[75] Inventors: Alex E. Jvirblis; Walter Roth; Murray Goodman, all of La Jolla, Calif.

[73] Assignee: Diagnostic Instruments, Inc., San Diego, Calif.

[22] Filed: Jan. 23, 1974

[21] Appl. No.: 435,714

Related U.S. Application Data

[63] Continuation of Ser. No. 212,470, Dec. 27, 1971, abandoned.

[52] U.S. Cl. .................... 427/22; 427/14; 427/198; 427/335; 427/385; 96/1 SD; 250/315 R; 428/199; 428/207; 428/913

[51] Int. Cl.$^2$ B44D 1/094; B44D 1/44; C03G 13/08

[58] Field of Search ........ 117/7, 9, 17.5, 63, 106 R, 117/11; 96/1 R, 1 SD, 114; 355/3, 17; 250/315; 427/14, 22, 198, 335, 385; 428/199, 207, 913

[56] References Cited

UNITED STATES PATENTS

| | | | |
|---|---|---|---|
| 1,783,895 | 12/1930 | Wright | 117/63 |
| 2,919,170 | 12/1959 | Epstein | 117/17.5 |
| 2,919,672 | 11/1960 | Benn et al. | 117/17.5 |
| 3,012,839 | 12/1961 | Epstein et al. | 117/17.5 |
| 3,022,543 | 2/1962 | Baird | 117/7 |
| 3,049,810 | 8/1962 | Iwerks | 117/21 |
| 3,140,160 | 7/1964 | Carlson | 117/21 |
| 3,220,840 | 11/1965 | Yackel et. al. | 96/114 |
| 3,600,210 | 8/1971 | Haycock | 117/17.5 |
| 3,607,357 | 9/1971 | Findlay | 117/63 |
| 3,607,505 | 9/1971 | Schirmer | 117/7 |
| 3,718,495 | 2/1973 | Tomita | 117/7 |

*Primary Examiner*—Michael Sofocleous

[57] ABSTRACT

A process for enhancing the optical density of images and the product resulting therefrom. The process comprises forming on a shrinkable substrate an image defined by a plurality of particles and having substantially less than an optimum optical density, and then forming a reduced-size image having a substantially improved optical density by shrinking said substrate with said image thereon.

16 Claims, 4 Drawing Figures

IMAGE INTENSIFICATION

This is a continuation of Ser. No. 212,470, filed Dec. 27, 1971, and now abandoned.

BACKGROUND OF THE INVENTION

This invention is in the field of development of images. More particularly, the invention relates to enhancing the optical density of developed images.

The general process known as ionography is a means for making X-ray images without the utilization of silver halide film. The basic process was disclosed by E. L. Criscuolo in NAVORD Report 4033 of July 6, 1955, in U.S. Pat. No. 2,900,515, in an article by R. A. Youshaw and J. A. Holloway in Nondestructive Testing, September – October, 1959, and by K. H. Reiss in Z. Angew. Physik, Vol.19, p. 1 (1965). This process comprises the utilization of two parallel plate electrodes having a gap therebetween. A d.c. voltage is applied across the electrodes such that one is a positive electrode and the other a negative one. If the positive electrode is nearest the X-ray or gamma ray source, it must not absorb much of this electromagnetic radiation. Typically the positive electrode has affixed to it an image-receiving sheet which may be optically transparent or opaque but must be an electrical insulator such as a thin sheet of a plastic film or the like. The negative electrode, if it is the electrode most distant from the radiation source, has a thin film or layer of a material which is an efficient absorber of X-rays applied to it. For example, in the aforementioned Reiss reference a heavy metal, such as lead, was disclosed as an absorber of the X-rays, and was in effect a photoemitter. The image-receiving insulator on the anode and the photoemitter layer on the cathode face each other across the gap between the electrodes with the object to be examined being disposed between the X-ray source and either the outer side of the anode or cathode, preferably on the outer side of the anode. A quenching gas is flowed, or in cases may be stationary, in the gap between the electrodes.

When the object is disposed adjacent the anode and is irradiated by X-rays or gamma rays, this electromagnetic radiation is differently absorbed by the object and passes through the transmissive anode and insulator layer affixed thereto and across the gap to strike the photoemitter which, as a consequence, ejects electrons having energies up to many kilo-electron volts. The number of electrons emitted from any area or portion of the photoemitter is dependent upon the number of X-ray photons absorbed in that portion, the depth of the absorption, and the photon energy. On leaving the photoemitter surface, the electrons find themselves in a d.c. field between the electrodes and travel toward the positive electrode. The quenching gas serves to slow down the electrons so that they will not scatter when reaching the insulator and to increase their number by secondary ionization. Upon arriving at the insulator surface, the electrons, and any negative ions which may have been formed by secondary ionization, are collected in an image configuration forming a latent electrostatic image consisting of negative charges corresponding to elements or portions of the object which are relatively transparent to X-rays and no charge or fewer charges corresponding to portions or elements of the object which are opaque or relatively opaque to X-rays. This latent image is then made visible by development or by cathode ray tube display techniques.

The development of the latent electrostatic images is accomplished generally by contacting the latent images with powder particles normally utilized for developing such images, not only in ionographic processes but in other processes where latent electrostatic images are formed, such as xerography and the like. Typical developer powder particles include charcoal, carbon black and various carbonaceous type pigments. Additionally, finely divided material, such as powdered resins having pigments or dyes added thereto, can be used. The use of such resins is desirable where the formed image is to be ultimately fused by heat or other means. The preferred particle size of the powder material is relatively small in order to maintain a good resolution of the developed image. For example, particles having average diameters of the order of 1 to 10 microns are normally utilized. The latent electrostatic image can either have a positive or negative charge, depending upon the polarity of the adjacent electrode utilized during the process of forming the image. Similarly, the powder particles have a charge thereon which can be induced by means of a corona discharge or in other ways. If the powder particles have a charge opposite to that of the latent image, they will then be attracted to the latent image charges forming a positive image. Alternatively, if the powder particles have a charge of the same polarity as that of the latent image, they will be repelled by the latent image and cover the substrate in the areas not occupied by the latent image, thus in effect forming a negative image. Hence the powder particles are given a charge, either opposite to or the same as the latent electrostatic charges on the substrate, depending upon the type of developed image desired.

The density of the developed image is basically affected by the amount of latent electrostatic charge produced on the substrate material. The density is also affected by the amount of developer powder utilized but there is a maximum density that can be achieved and this is determined principally by the strength of the electrostatic charge of the latent image. Thus, an excess of developer powder cannot make an image any denser than the limitations set by the latent image. On the other hand, a lesser amount of powder can decrease the density regardless of the amount of the latent electrostatic charges on the substrate. The ionographic process, which can be used to produce images of internal portions of the human body heretofore typically accomplished by conventional exposure of film by X-rays, is particularly useful in mammography. While normal X-ray procedure involves the production of a photographic image on film, in ionography a similar image is produced by development of electrostatic charges deposited in latent image configuration on an insulative substrate. In ionography as in conventional X-ray photography, there is a generally optimum preferred density for a developed image.

A particular advantage of ionography, as compared to normal X-ray techniques, is the ability to produce clear images with reduced X-ray exposures. But it is desirable that clear developed images of optimum density be produced with still lower X-ray exposures. As indicated above, the strength of the electrostatic charges that define or constitute the latent image affects the density of the resulting optical or visual image. But the strength or amount of charge does not affect to any great degree the resolution or other image characteristics. Hence, if optically denser images can be made with latent electrostatic images of a given field or level of charge, then excellent developed images can be produced at lower X-ray exposures.

As will be further appreciated from the discussion of the present invention, the process and product thereof will have applicability to processes in addition to ionography, such as xerography and the like wherein latent electrostatic images are produced on insulative substrates and subsequently developed. In such other processes, using the same exposure levels for production of latent electrostatic charges on the substrate, one can increase the optical density of the developed image in accordance with the present invention, or one can produce developed images of the same desirable level of optical density with lower levels of exposure. The ability of the present invention to substantially improve the optical density of images is of value in systems other than those in which electrostatic images are produced on an insulative substrate, for example, it may be used to increase the optical density of images produced by thermochromic, photochromic, or free-radical imaging systems. In all such systems, the concept of this invention is applicable through the formation of an image having less than optimum optical density on a shrinkable substrate and subsequently shrinking the substrate to form a reduced-size image having a substantially improved optical density. As used herein, the term "on a substrate" includes the image being actually formed within the substrate such as in the free-radical imaging process.

While no prior art was found in the field of this invention, image intensification, there have been instances in which images have been reduced or expanded in size. For example, a toy was found in which a heat-shrinkable opaque substrate having a design printed in ink thereon is heated to shrink the image and substrate to provide a distorted smaller image. However, the use of this toy to provide amusement for children did not improve the image density inasmuch as the image density was initially of optimum density and no increased optical density resulted from the shrinkage. In another relatively remote art, margin justification of typewritten matter or the like, U.S. Pat No. 1,992,017 proposes to print or type on corrugated paper strips which are then manually stretched or contracted to effect justification of the ends of the lines. Again in another quite different field, reproduction of copy to be transferred to a rubber blanket to be used in letter press and offset printng, U.S. Pat. No. 3,301,127 proposes to compensate for distortion occurring when the blanket is curved around the press cylinder, by distorting the image produced on the flat blanket. However, in none of the above-cited prior procedures was any improvement in optical density of an image contemplated.

SUMMARY OF THE INVENTION

An object of this invention is to provide a method for substantially improving the optical density of images on a substrate. It is a particular object of this invention to provide developed images of enhanced optical density from latent electrostatic images. A further object of the invention is to provide high quality developed ionographic images with lower X-ray exposures. Other objects and features will be in part apparent and in part pointed out hereinafter.

The above and other objects are accomplished by the novel methods and products of this invention in which images such as latent electrostatic images are produced on insulative substrates by a process such as ionography. Such latent electrostatic images are then contacted with pigmented fusible powder particles. However, in accordance with the present invention, a lower exposure of X-ray is required and the latent image formed on the substrate has a weaker electrostatic charge so that a lesser amount of powder particles will be attracted thereto to provide an image having substantially less than optimum optical density, i.e., a density less than that preferred for practical applications. In accordance with this invention, the insulative substrate utilized is a shrinkable film which may, for example, be shrunk by the application of heat thereto. After development of the latent image on the film by the deposition of the pigmented powder particles, the film is then heated to a temperature sufficient to cause it to shrink. The optical density of the resulting reduced-size image is substantially improved as a function of the degree of shrinkage. The temperature to which the substrate is heated to achieve the shrinkage is normally sufficient to additionally and concurrently fuse the powder particles to produce a fused, developed and intensified image. In addition to a heat-shrinkable substrate, intensification can be achieved by producing the latent image on a stretched elastomer substrate which is subsequently allowed to return to its normal dimensions or by subjecting a shrinkable polymer film to a suitable solvent vapor.

BRIEF DESCRIPTION OF THE DRAWINGS

Corresponding reference characters indicate corresponding elements throughout the drawings.

DESCRIPTION OF PREFERRED EMBODIMENTS

Figure 1:
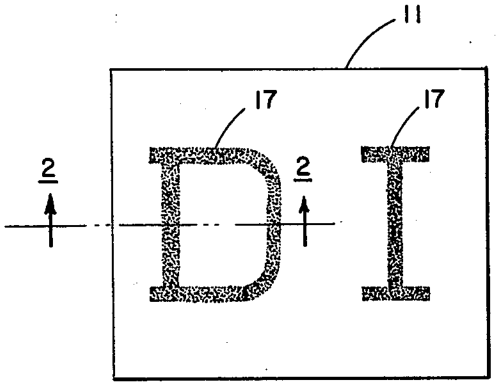
FIG. 1 is a top plan view of a heat-shrinkable substrate having a developed image thereon.
Figure 2:
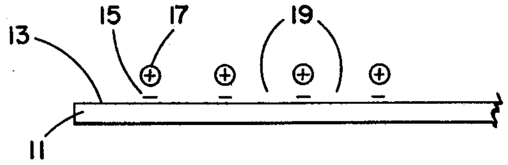
FIG. 2 is a cross-sectional view taken along line 2—2 of FIG. 1 showing a substrate and an exaggerated representation of latent electrostatic charges and developer powder particles attracted thereto.

Turning now to FIGS. 1 and 2, there is shown a substrate 11 of a heat-shrinkable film of an electrically nonconductive material. In describing this invention, reference will be made to images defined or constituted by latent electrostatic charges produced on film by a process such as ionography, but it is to be understood that images may be formed on shrinkable substrates by other processes. Thus, on the surface 13 of film 11, there are a plurality of negative charges 15 which form or constitute a latent electrostatic image such as illustrated by the letters DI in FIG. 1. Though negative charges 15 are shown, the latent electrostatic image may be formed of positive charges as well. If the electrostatic image is formed by an ionographic process, for example, the polarity of the charges will be dependent upon the polarity of the spaced-apart conductive plates utilized in the process with the charges being of polarity opposite to that of the conductive plate on which the substrate or film 11 is disposed. Film 11 with the electrostatic image formed of charged particles 15 is subjected to a development process which normally comprises contacting the charged particles 15 with a cloud of fine powder or toner particles 17 which have been charged to have a polarity opposite to that of the latent image.

Thus, as further seen in FIG. 2, the positively charged powder particles 17 are attracted to the negative latent image charges, as is conventional, to form a developed image illustrated by the letters DI in FIG. 1. Powder particles 17 are well-known in the art of developing electrostatic images and any suitable fusible powder particles can be used. Examples include materials such as acrylic resins sold under the trade designation "Lucite" by E. I. du Pont de Nemours and Co., and styrene polymers such as those sold under the trade designation "Piccolastic" by Pennsylvania Industrial Chemical Corp. The powder particles 17 typically have a pigment therein such as charcoal, lamp black, or nigrosine dye or the like, so that the developed image will be readily visible. Additionally, nonfusible powders may be fixed to the substrate by softening the substrate, by overcoating, or the like.

The optical density, D, of a formed image is given by the equation $D=\log_{10}1/T$, where T is the fractional transmission of light through the image. Thus, in accordance with this equation, a density of 1 is obtained when 10 percent of the available light is transmitted through a uniformly darkened area of the image 17. A density of 2 is obtained when the transmission of light is one percent. It has been previously established that the human eye cannot distinguish an increase in density of an image when the density is increased above about 2, using ordinary illumination techniques. For projected images, greater densities may be distinguished. The foregoing discussion of density, which relates to the effect of transmission of light, pertains to the utilization of a light transparent substrate or film 11. There is an alternative expression of an image's optical density based upon reflected light, where density is given by $D=\log_{10}1/R$ and R = reflectivity and which is useful where the substrate 11 is light-reflective rather than transparent. For reflective density, it is known that the human eye cannot distinguish an increase in intensification of an image or increased density thereof above a value of about using ordinary illumination techniques. In other words, it is not necessary to increase the density of an image on a reflective substrate to exceed a value of about 1.5.

Hence the density of a developed latent electrostatic image is a function of the latent electrostatic charges 15 produced on the surface 13 of insulative substrate or film 11. This is in turn a function of the exposure period as indicated above. Likewise, in other processes such as xerography, the density of the latent electrostatic charge image produced is also a function of exposure time. FIG. 2 depicts an image cross section wherein a significant amount of light can be transmitted through the substrate 11 and between the spaces 19 formed between the powder particles 17 attracted to the charges 15. For example, FIG. 2 may be deemed to represent a condition wherein 50 percent of the available light is transmitted through the developed image through spaces 19. Such an image is of an apparent optical density which is substantially less than optimum and, as such, obviously will not appear significantly intense to the eye. Such an image would be generally unsatisfactory for reproductive purposes since it would be difficult to resolve the definition of the image with such a high light transmission therethrough. While such an image has these disadvantages, production of such an image by an ionographic process as indicated above has the advantage of needing a significantly shorter X-ray exposure time. However, if nothing further is done and if the particles 17 are then fused to the substrate 11, the resulting image is unsatisfactory for most purposes.

In accordance with one embodiment of the present invention, a material is chosen for the substrate 11 which is a heat-shrinkable film. Such materials are well-known and available. For example, heat-shrinkable films have been utilized in the packaging industry to a great extent. These are such that, if they are stretched by various means they will retain a "memory" of their original condition and, upon heating, return to their original configuration or dimensions. Heat-shrinkable films include thermostretchable polymers, thermoplastic films and generally any polymer film that can be shrunk and may be films which are biaxially oriented. These are generally noncross-linked film-forming polymers. Specific exemplary materials include vinyl resins, vinyl polymers and copolymers, vinyl chloride polymers and copolymers, vinyl chloride-vinyl acetate copolymers, plasticized polyvinyl chloride, vinylidene chloride polymers and copolymers, vinylidene chloride-vinylchloride copolymers, sarans, fluorinated polymers and copolymers, polyvinyl fluoride, polyvinylidene fluoride, polytetrafluoroethylene, polychlorotrifluoroethylene, copolymers of vinylidene fluoride and hexafluoropropylene, low or high density polyethylene and irradiated polyethylene, α-olefins polymers and copolymers, polypropylene, polybutene-1, ethylene-propylene copolymers, styrene polymers and copolymers, polymethylmethacrylate, methyl methacrylate copolymers, alkyl methacrylate polymers and copolymers, acrylate polymers and copolymers, polymethacrylonitrile polymers and copolymers, acrylonitrile polymers and copolymers, rubber hydrochloride, diene polymers and copolymers. Also useful are cross-linked or at least partially cross-linked polymers, such as irradiated thermoplastic and vinyl polymers, rubbers, diene polymers and copolymers, graphite copolymers of styrene and rubber condensation polymers including polyesters, polyamides, polycarbonates, polysulfones, polyoxymethylenes, polyesters, polyisocyanates, polyurethanes, spandex films, polyamides, siloxane polymers, protein films, biopolymer model systems. Additionally, visco elastic material such as lightly cross-linked polystyrene are contemplated. Further, ionomer resins can be used for the shrinkable substrates herein.

The films are often stretched under heated conditions and quenched while in a stretched condition whereby they retain the enlarged dimensions. Irradiation may additionally be utilized prior to stretching in order to further impart a memory to the material.

In the production of images when it is desired to avoid image distortion of the image, a shrinkable substrate or film is used which shrinks uniformly in all dimensions of the image plane so that the reduced-size image is geometrically similar to the original image. Whether the film shrinks uniformly or disproportionately is often a function of the method in which the film is stretched as well as the orientation of the polymer when oriented polymers are utilized. For example, PVC films can be biaxially oriented to shrink equally in both the machine and the transverse direction. Other PVC films have been made which are oriented mostly in the machine direction. These are referred to as preferentially shrunk films and shrink very slightly in the transverse or lateral direction, resulting in preferential shrinkage in the longitudinal direction. Commercial examples of films that will shrink equally or uniformly in the image plane include "Reynolon 4155" polyvinyl chloride film made by Reynolds Metals. Another example is "Clysar EHC" irradiated polyolefin made by E. I. du Pont de Nemours & Co.

For most purposes, it is desirable that the film be transparent so that the fused image can be projected or viewed with a light source. However, translucent films, pigmented substrates and relatively opaque polymer films are useful in the practice of this invention where the image is read with reflected light.

Figure 3:
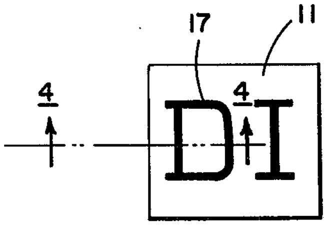
FIG. 3 is a top plan view of the substrate of FIG. 1 after it has been shrunk whereby the image is intensified; and, FIG. 4 is a cross-sectional view taken along line 4—4 of FIG. 3, showing an exaggerated representation of the developer powder particles after shrinkage of the substrate.
Figure 4:
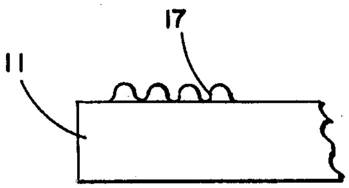

In accordance with this invention, heat-shrinkable film is cut to a size which may be conveniently accommodated in the image-producing apparatus and which will accommodate the desired size image thereon. An exemplary developed image of less than optimum density as produced by ionographic techniques or other known procedures on a shrinkable substrate is seen in FIGS. 1 and 2. The original size substrate or film 11 with the developed image is then subjected to a temperature sufficient to shrink the film substrate uniformly in all directions whereby image 17 is intensified. As seen in FIGS. 3 and 4, the effect of this shrinkage is to thicken the film (as indicated at 11') and to move the adjacent developer particles 17 of the image closer to each other thereby substantially increasing the concentration of image-defining particles per unit of area and thus diminishing the amount of light that can be transmitted through the substrate and between the particles and accordingly intensifying the image. Utilizing a film that will shrink equally or uniformly in both dimensions of the image plane, it should be apparent that the transmission of the image will generally decrease in accordance with the area ratio of the shrinkage. Thus, if the film shrinks to one half of its size in each planar dimension, the transmission should generally decrease fourfold.

The developer particles 17 can be fused onto the substrate surface 13 prior to shrinkage by subjecting them to a temperature sufficient to achieve such fusing. Alternatively, they can be subjected to a flash discharge from a xenon or similar light source to achieve such fusing. It is to be noted that one of the advantages of this invention is that the temperature to which the substrate is heated for effecting shrinkage may also be a temperature that will normally fuse the available powder particles 17. Thus, an unfused image on an original or shrinkable substrate 11 as shown in FIG. 2 when heated to effect shrinkage may concurrently effect fusion of particles 17 to the substrate 11' as shown in FIG. 4.

The size and density of the initial image formed as shown in FIGS. 1 and 2 is related to the shrinkage that can be achieved with the given film. Thus, for example, one skilled in the art can determine the proper initial adjustment of parameters for producing the initial latent electrostatic image of a less-than-optimum density such that the duration of the X-ray exposure in ionography (or light exposure in xerography and the like) to produce a resulting image of satisfactorily improved density after shrinkage as shown in FIG. 4. The more the film shrinks, the lesser the requisite initial image density.

The resulting shrunk film of FIG. 3 can be readily projected on an enlarged scale on a screen or overhead projector, or the like, and has the further advantage that it provides for relatively compact storage of information as compared to the large film as shown in FIG. 1. Further, because of the shrinkage, the film and image thicknesses are inherently increased somewhat. Thus, a flexible film of FIG. 1 is relatively rigid when shrunk as shown in FIG. 3, providing for a more durable and more easily handled material. The film initially can be cut to such dimensions that upon shrinkage it will produce a slide of conventional 35 mm size or a slide of virtually any desirable dimensions, depending upon the type of apparatus with which it is to be viewed.

It is preferred to utilize films that shrink equally biaxially in both directions or shrink uniformly in order to prevent distortion of the formed image. It should be apparent that one can utilize, depending upon the characteristics of the images, films that shrink preferentially in one direction. Where the difference in magnitude of shrinkage between the two dimensions is not significant, for example, on the order of 10 percent or the like, the distortion introduced by the shrinkage is hardly visible to the eye, particularly with printed matter. The amount of shrinkage is dependent upon the time and temperature of heating. Normally, as the polymer substrate shrinks, resolution in the image does not degrade since shrinking under areas containing developer particles moves these particles closer to one another to the extent that it may result in a piling up or embossing effect. Thus, in practice, it has been found that as to an image on which an 8 lp/mm grid could be resolved before shrinkage, the same resolution was retained following an area shrinkage by a factor of about 7. This effect may be aided by the fact that the molten developer particles have a high surface tension and tend to form a convex meniscus at their surfaces. However, for very high resolution images where neighboring image areas which are very close to one another must be resolved, there is some possibility that, during shrinkage of the substrate, such neighboring areas will merge and resolution will be lost. This will be particularly true if the shrinkage temperature is high since, for most liquids, surface tension decreases with increasing temperature and the molten developer particle may tend to flow and form a larger area droplet with a flatter meniscus. In such cases, it is desirable that the polymeric component of the developer particles be also of a heat-shrinkable material. Thus, as the substrate shrinks, the developed image areas simultaneously shrink, overcoming the decrease in surface tension and substantially preventing merging of neighboring image areas.

Though the above discussion has been particularly concerned with the process of ionography, there has also been mention of application of this invention to other processes were latent electrostatic images are produced on insulative substrates such as xerography, as to which there continues to exist the need for improvement of the speed of the overall xerographic operation. One of the limiting factors in xerography, and, in fact, in other processes for producing latent images, is the duration of exposure. The present invention provides a means for significantly decreasing the length of exposure in xerography and other processes for producing electrostatic images whereby an underexposed image is intensified to produce the desired end results. For example, one can utilize an underdeveloped image from a xerographic process wherein an insufficient amount of developer powder had contacted the latent electrostatic charge. In such cases one can shorten either the development time or the exposure time, or both, in xerographic processes by the present invention.

As alternatives to the use of heat to shrink a film having an image for intensification thereof, other suitable techniques can be used in accordance with this invention. For example, an oriented or stretched film can be subjected to solvent vapors sufficient to soften it to the point of shrinkage. Generally, any of the above-mentioned heat shrinkable films can be so subjected to solvent vapors. For example, a stretched film of styrene-isoprene or styrene-butadiene copolymers cast from isooctane can be subjected to vapors of toluene for a period of time sufficient to achieve such shrinkage. The solvent vapors additionally serve to fuse the developer powder on the substrate as does heat where the heat shrinkable substrates are used.

Another embodiment of this invention involves using a film of an elastomer that is initially biaxially mechanically stretched and held under tension. While being maintained in the stretched condition, a latent image is produced and developed on the film. Tension on the film is then released to permit it to return to its original dimensions rapidly without the application of heat. Such films can then be post-treated either chemically or physically to ensure dimensional stability. As an example, in polymers which contain double bonds, ultraviolet irradiation can be used to cause sufficient cross-linking to create a substantial micro-molecular network. Examples of elastomers which are suitable for being stretched in this manner include but are not limited to natural rubbers, styrene-butadiene rubbers, polybutadiene, sulfide rubbers, neoprene, sulfur chlorinated polyethylene stereo rubbers such as poly (1,4-cis-butadiene), poly (1,4-transbutadiene), poly (1,4-cis-isoprene) and poly (1,4-trans-isoprene). Further, elastomeric copolymers could be used including butyl rubber, ethylene-propylene copolymers, polypropylene oxide, styrene-butadiene rubber, block copolymers of styrene-isoprene and styrene-butadiene and the like.

The following detailed examples further illustrate the invention.

EXAMPLE I

A 5 × 7 inches sheet of polystyrene having a thickness of 0.008 inches was utilized as a substrate upon which an image was produced and developed in accordance with this invention. This substrate was placed in an ionographic arrangement utilizing a lead photoemitter layer on a glass plate. The sheet of polystyrene was placed on a plate opposite from the photoemitter surface facing the photoemitter. The plate was made of bakelite having an aluminum foil conductive surface thereon. The polystyrene sheet was placed on the aluminum foil. The gap between the photoemitter and the polystyrene was 7 mils. A flowing argon quenching gas was utilized through the gap. The top plate was placed 27 inches from the target of the X-ray source used. An image including a hand phantom, an aluminum step wedge and wire grids used for resolution, was made at an exposure of one second at a level of 30 kvp and 100 ma applied to the plates of the ionographic device. The X-ray exposure was 0.20 R. To obtain an image of desired optical density witout the practice of the present invention, a normal X-ray exposure time of 5 seconds would be required and this would be equal to an X-ray exposure of 1.0 R. The latent electrostatic image so produced on the polystyrene was then developed by contacting it with charged black toner particles in a conventional manner. The developed electrostatic image was too faint for normal usage. The polystyrene substrate was then placed in an oven heated to a temperature of 130°C. for about 1 minute. The polystyrene shrank to about 1/7 of its original area, increasing its thickness correspondingly. Comparison of the two images indicated that the optical density of the shrunken image was satisfactory for normal usage by direct viewing or projection.

EXAMPLE II

An unfused toner image of a printed page was formed on a paper substrate, utilizing a conventional reproduction technique. The toner image had a desired optical density. This unfused toner image was then placed against a 7 × 7 inches sheet of "Reynolon 4155" polyvinyl chloride film made by Reynolds Metals. This substrate with the paper thereagainst was then placed in a corona discharge device to transfer the toner particles from the paper to the film. In so doing, the transferred toner image lost considerable density since not all of the toner particles were transferred to the film. The film substrate with the toner particles was then placed in a 300°F. oven for one minute and shrunk to ¼ of its original area whereby the image was fused and significantly intensified.

In view of the above, it will be seen that the several objects of the invention are achieved and other advantageous results attained.

As various changes could be made in the above methods and products without departing from the scope of the invention, it is intended that all matter contained in the above description or shown in the accompanying drawings shall be interpreted as illustrative and not in a limiting sense.

What is claimed is:

1. A process for enhancing the optical density of human-readable images formed of visible material applied on a substrate comprising:
   - forming on a shrinkable substrate an image defined by a plurality of powder particles adapted to provide an image having substantially less than an optimum density; and
   - forming a reduced-size image of substantially improved optical density by shrinking said substrate with said image thereon, said particles being fixed on the substrate.

2. A process as set forth in claim 1 wherein said shrinkable substrate comprises a heat-shrinkable resin material and the step of forming a reduced-size image comprises heating said material to a temperature sufficient to effect shrinkage thereof.

3. A process as set forth in claim 2 wherein said particles are fusible, and said heating of said material concurrently causes fusing of said particles.

4. A process as set forth in claim 1 wherein said shrinkable substrate comprises stretched elastomeric material, and the step of forming a reduced-size image comprises causing said stretched elastomeric material to return to a substantially unstretched condition.

5. A process as set forth in claim 1 wherein said shrinkable substrate comprises a resin material adapted to shrink when contacted by a solvent therefor, and the step of forming a reduced-size image comprises contacting said material with solvent vapor for a period of time sufficient to effect shrinkage of the substrate.

6. A process as set forth in claim 1 wherein said shrinking of said resin is effected substantially uniformly in all directions along the surface of said substrate on which said image is formed whereby said image is reduced in size substantially without distortion.

7. A process as set forth in claim 1 wherein the step of forming an image on a shrinkable substrate comprises applying thereto a plurality of relatively opaque particles in an image-defining pattern.

8. A process comprising:

forming a latent electrostatic image on a shrinkable substrate;

developing said latent image by contacting it with powder particles of a fusible material; and shrinking said substrate with said developed image thereon and fusing the particles to form a reduced-size image of increased optical density.

9. A process as set forth in claim 8 wherein said shrinking of said substrate is effected substantially uniformly in all directions along the surface of said substrate on which said image is formed whereby said image is reduced in size substantially without distortion.

10. A process as set forth in claim 8 wherein the stop of developing an image comprises applying thereto a plurality of relatively opaque fusible particles.

11. A process as set forth in claim 8 wherein said shrinkable substrate comprises a heat-shrinkable resin material and the step of forming a reduced-size image comprises heating said material to a temperature sufficient to effect shrinking thereof.

12. A process as set forth in claim 8 wherein said shrinkable substrate comprises a stretched elastomeric material, and the step of forming a reduced-size image comprises causing said elastomeric material to return to a substantially unstretched condition.

13. A process as set forth in claim 8 wherein said shrinkable substrate comprises a resin material adapted to shrink when contacted by a solvent therefor, and the step of forming a reduced-size image comprises contacting said material with solvent vapor for a period of time sufficient to effect shrinkage of the substrate.

14. A process for enhancing the optical density of human-readable images formed of visible material applied on a substrate comprising:

forming on a shrinkable substrate a latent electrostatic image; developing this image by contacting it with powder particles of a fusible material so that the image is defined by a plurality of particles adapted to provide an image having substantially less than an optimum density; and forming a reduced-size image of substantially improved optical density by shrinking said substrate with said image thereon; said powder particles being fixed on the substrate.

15. A process as set forth in claim 14 wherein the latent electrostatic image formed has a density of charges less than that required to produce a developed image having an optimum optical density.

16. A process as set forth in claim 14 wherein the developed latent electrostatic image has a density of powder particles less than that required to produce a developed image having an optimum optical density.

* * * * *